United States Patent [19]
Izumisawa et al.

[11] Patent Number: 6,072,288
[45] Date of Patent: Jun. 6, 2000

[54] CONTROL APPARATUS FOR PERMANENT MAGNET ELECTRIC MOTOR USED IN ELECTRIC MOTOR VEHICLE IN WHICH A PREDETERMINED MAGNETIC POLE LOCATION SIGNAL PULSE IS SUPPLIED UPON STARTING

[75] Inventors: Katsuyuki Izumisawa, Hitachinaka; Sanshiro Obara, Tokai-mura; Toshisada Mitsui, Hitachinaka, all of Japan

[73] Assignee: Hitachi, Ltd., Tokyo, Japan

[21] Appl. No.: 09/028,691

[22] Filed: Feb. 24, 1998

[30] Foreign Application Priority Data

Feb. 24, 1997 [JP] Japan .................................. 9-038796

[51] Int. Cl.⁷ ........................................................ H02P 7/00
[52] U.S. Cl. ............................ 318/254; 318/439; 318/139
[58] Field of Search ..................................... 318/254, 439, 318/138, 139, 799–815

[56] References Cited

U.S. PATENT DOCUMENTS

| | | | |
|---|---|---|---|
| 4,250,435 | 2/1981 | Alley et al. .............................. | 318/138 |
| 4,494,051 | 1/1985 | Bailey ..................................... | 318/254 |
| 5,057,753 | 10/1991 | Leuthold et al. ....................... | 318/254 |
| 5,717,297 | 2/1998 | Karwath et al. ........................ | 318/254 |
| 5,767,639 | 6/1998 | Sakaguchi et al. ..................... | 318/254 |
| 5,847,524 | 12/1998 | Erdman et al. ......................... | 318/439 |

FOREIGN PATENT DOCUMENTS

| | | |
|---|---|---|
| 62-25893 | 2/1987 | Japan . |
| 6-225588 | 8/1994 | Japan . |

*Primary Examiner*—Jonathan Salata
*Attorney, Agent, or Firm*—Evenson, McKeown, Edwards & Lenahan, PLLC

[57] ABSTRACT

A control apparatus of an electric motor vehicle includes a device for operating an initial magnetic pole location based on three phase magnetic pole location signal pulses of a permanent magnet electric motor upon starting the electric motor vehicle, a device for operating a magnetic pole phase of the permanent magnet electric motor on the basis of the initial magnetic pole location, a rotation pulse of the permanent magnet electric motor, and a correction value which are operated with the rise and fall of the three phase magnetic pole location signal pulse after the starting, a device for determining a current to be supplied into the permanent magnet electric motor based on the magnetic pole phase and a torque reference value, and a device for correcting the magnetic pole phase when a predetermined one of the three phase magnetic pole location signal pulses rises or falls. In such an apparatus, as the magnetic pole phase is revised on the basis of the magnetic pole location signal of any one phase among the three phase magnetic pole location signals, the revising frequency of the magnetic pole phase becomes low and the microcomputer processing burden when the magnetic pole phase correction device operates in a high-speed rotation can be reduced.

3 Claims, 10 Drawing Sheets

CONTROL APPARATUS FOR PERMANENT MAGNET ELECTRIC MOTOR USED IN ELECTRIC MOTOR VEHICLE IN WHICH A PREDETERMINED MAGNETIC POLE LOCATION SIGNAL PULSE IS SUPPLIED UPON STARTING

BACKGROUND OF THE INVENTION

1. Field of the Invention

The present invention relates to a control apparatus for an electric motor vehicle, and especially relates to a control apparatus for a permanent magnet electric motor suitable for the electric motor vehicle.

2. Description of the Prior Art

Generally in the control apparatus for an electric motor vehicle driven by a permanent magnet type synchronous motor, it is indispensable to realize a wide variable speed and variable torque control. A current control part in the control apparatus receives a torque reference previously operated according to a necessary torque and a rotation speed of the electric motor and information of the relative location of a magnetic pole of a rotor to a stator, and determines current and phase of the electric power that should be supplied into the electric motor on the basis of the torque reference and the information received, and further generates a driving signal for power elements of an inverter bridge so as to supply electric power and drive the electric motor. For example, such conventional devices are disclosed in Japanese Patent Laid-open No. 62-25893 (1987), Japanese Patent Laid-open No. 6-225588 (1994).

SUMMARY OF THE INVENTION

In a control system for a permanent magnet type synchronous motor, the information of the positional relationship between the rotation speed and the magnetic pole phase, that is, of the magnetic pole of the rotor and the coil of the stator, needs to be detected precisely.

Among this information which is received from various detectors mounted on the electric motor, the rotation speed need not be received as an instantaneous value, because the variation of the rotation speed includes a time constant caused by inertia of the drive system. Moreover, even if the detection result includes error, it can be resolved by providing an arithmetic time constant or by averaging it out. On the other hand, the phase of the magnetic pole needs an instantaneous value, in order to generate a necessary torque by controlling the current phase of alternate current (ac) flowing in the electric motor so as to synchronize to the magnetic pole phase. In the electric motor vehicle driven by the synchronous motor especially, as the electric motor vehicle may be moved when the system is not activated, the drive system may not always hold a state when the system is not activated, and it becomes necessary to detect the magnetic pole location in every starting and then to take in the magnetic pole phase that changes with the rotation of the electric motor until the system will no longer be activated. So the magnetic pole location in starting of the motor is detected by a magnetic pole position sensor, the magnetic pole phase is obtained by an operation based on a rotation speed detected by a rotation speed detecting device while driving the motor.

When an operation error of the magnetic pole phase occurs, it must be corrected according to the real magnetic pole location of the rotor. This correction method of the magnetic pole location is performed by correcting a difference between the output of the magnetic pole position sensor as a reference signal of the magnetic pole phase and the magnetic pole phase obtained by converting the output of the rotation speed detecting device into an angle displacement.

Here in a conventional method, as the magnetic pole position sensor outputs signals of U, V, W phase in a three phase synchronous motor for example, the above correcting operation is performed in every 60 degrees of the electrical angle, that is, 6 times by one cycle. The electric motor for the electric motor vehicle must rotate at a high-speed for miniaturization thereof, and number of correction operations per unit time increases, thereby the processing burden of the micro-computer increases.

Moreover, because the maximum number of used I/O ports is fixed by the micro-computer adopted in the system, there was a problem as three I/O ports, for example, were occupied by the magnetic pole position sensors from start to end of the system.

An object of the present invention is to reduce the processing burden of the micro-computer for operation of the magnetic pole phase which is needed in the processing for the current control in the permanent magnet type synchronous motor for driving the electric motor vehicle.

According to an aspect of the present invention, a control apparatus of an electric motor vehicle comprises means for operating an initial magnetic pole location based on three phase magnetic pole location signal pulses of a permanent magnet electric motor in starting the electric motor vehicle, means for operating a magnetic pole phase of said permanent magnet electric motor on the basis of said initial magnetic pole location, a rotation pulse of the permanent magnet electric motor, and a correction value which are operated in rise and fall of said three phase magnetic pole location signal pulse after the starting, means for determining a current to be supplied into said permanent magnet electric motor based on said magnetic pole phase and a torque reference value, and means for correcting said magnetic pole phase when a predetermined one of said three phase magnetic pole location signal pulses rises or falls.

It is desirable to provide in the present invention, means for correcting said magnetic pole phase when a predetermined one of said three phase magnetic pole location signal pulses rises or falls, and a differential value of said magnetic pole phase operated and a theoretical value thereof is more than a predetermined value.

According to another aspect of the present invention, a control apparatus of an electric motor vehicle comprises, a magnetic pole phase operation means for operating a magnetic pole phase of a permanent magnet electric motor, a current control means for controlling an inverter based on said operated magnetic pole phase and rotation of said permanent magnet electric motor, said control apparatus of said electric motor vehicle being characterized by further comprising a port changing means in which all of the magnetic pole location signals of three phase detected from said permanent magnet electric motor are supplied to said current control means upon starting said electric motor vehicle and only a predetermined one of said magnetic pole location signals is supplied to said current control means after the starting.

According to another aspect of the present invention, a control apparatus of an electric motor vehicle comprises, a magnetic pole phase operation means for operating a magnetic pole phase of a permanent magnet electric motor, a current control means for controlling an inverter based on said operated magnetic pole phase and rotation of said permanent magnet electric motor, said control apparatus of said electric motor vehicle being characterized by further comprising a magnetic pole location detecting means for outputting magnetic pole location signals of three phase according to magnetic pole locations of said permanent magnet electric motor, a magnetic pole location operation means for operating an initial magnetic pole location based on said magnetic pole location signals of said three phases, a magnetic pole phase correction means for supplying said magnetic pole location correction value operated to said magnetic pole phase operation means based on a predetermined one of said magnetic pole location signals of said three phases, and a port changing means in which all of said magnetic pole location signals are supplied to said magnetic pole location operation means upon starting said electric motor vehicle, and a predetermined one of said magnetic pole location signals is supplied to said magnetic pole phase correction means and the other two of said magnetic pole location signals stop being supplied to said magnetic pole location operation means after start-up.

Desirably in the present invention, port changing means are provided in which said other two of said magnetic pole location signals stopped from being supplied to said magnetic pole location operation means are changed not to relate to said magnetic pole location operation means.

According to another aspect of the present invention, a control apparatus of an electric motor vehicle comprises, a permanent magnet electric motor, a magnetic pole location detecting means for outputting a magnetic pole location signals of three phases of said permanent magnet electric motor, a rotation speed detecting means for outputting a rotation speed detecting signal of said permanent magnet electric motor, a magnetic pole location operation means for operating magnetic pole location based on said magnetic pole location signals, a magnetic pole phase operation means for operating a magnetic pole phase of a rotor of said electric motor based on said rotation speed detecting signal, a rotation speed operation means for operating a rotation speed of said electric motor based on said magnetic pole phase operated by said magnetic pole phase operation means, a current detecting means for detecting electric motor current of said permanent magnet electric motor, a torque reference value generating means for operating a torque reference value which said electric motor should generate according to a driving condition and driver's operation, a current control means for operating an alternating voltage value applied to said permanent magnet electric motor based on said torque reference value, said rotation speed, and said electric motor current, a pulse width modulation signal generating means for generating a pulse width modulation signal on the basis of said alternating voltage value, and an inverter bridge for supplying electric power to said permanent magnet electric motor according to said pulse width modulation signal, said control apparatus of said electric motor vehicle being characterized by further comprising a magnetic pole phase correction means for correcting said magnetic pole phase prior to said current control means when one of said magnetic pole location signals of said three phases rises or falls.

DETAILED DESCRIPTION OF THE PREFERRED EMBODIMENTS

Figure 1:
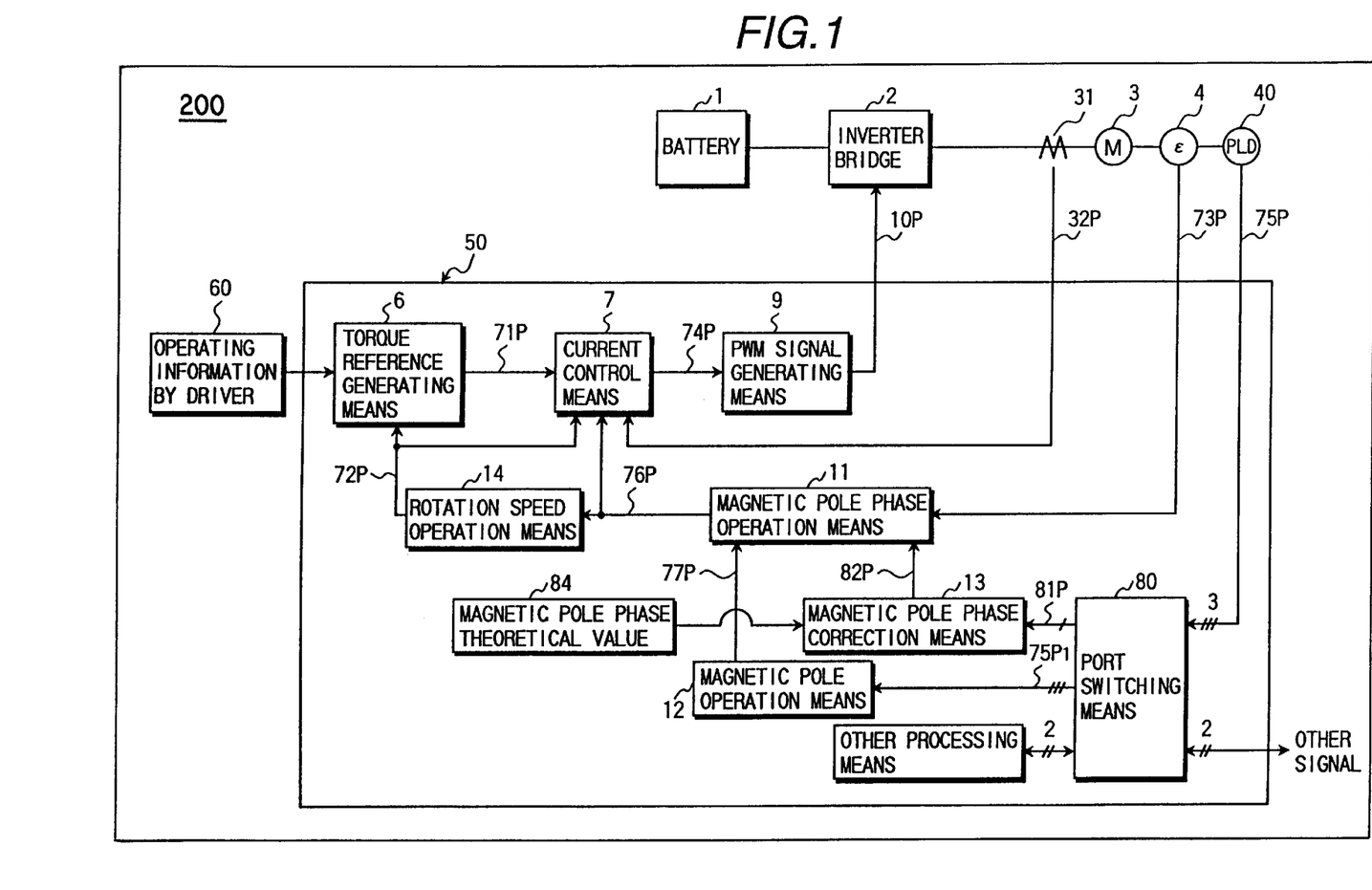
FIG. 1 is a schematic block diagram showing a control apparatus of an electric motor vehicle as an embodiment of the present invention.

An embodiment of the present invention will be explained using the drawings. FIG. 1 is a block diagram of a driving part and a control part of an electric car.

In FIG. 1, an inverter bridge 2 converts a direct current power supplied from a battery 1 into an alternating electric power, and the alternating electric power is supplied to a permanent magnet electric motor 3. By this embodiment of the present invention, power elements such as an IGBT (Insulated Gate Bipolar Transistor) are used for the inverter bridge 2, and a permanent magnet for the type three phase synchronous motor is used permanent magnet electric motor 3.

In the permanent magnet electric motor 3, a rotation speed detecting means 4 such as an encoder to detect a rotation speed, and a magnetic pole location detecting means 40 to detect a magnetic pole location of a rotator are arranged.

Here, the electric current which the inverter bridge 2 supplies into the permanent magnet electric motor 3 is decided by a PWM (Pulse Width Modulation) signal operated by a microcomputer 50 as the controlling device.

Operating information 60 of the vehicle by a driver such as a shift position of a transmission gear, an accelerator opening and a brake pressing amount, a detecting signal 32P of a current supplied into the permanent magnet electric motor 3 from the inverter bridge 2, a rotation speed detecting signal 73P of the permanent magnet electric motor 3, and a magnetic pole location signal 75P are input into the microcomputer 50.

The operating information 60 by the driver, and a rotation speed 72P generated by a rotation speed operation means 14 on the basis of the rotation speed detecting signal 73P are input into a torque reference generating means 6 in the microcomputer 50, thereby the torque reference generating means 6 generates a torque reference value 71P so as to output it into a current control means 7. Rotation speed operation means 14 produces a rotation speed 72P from the variation of a magnetic pole phase operation signal 76P to be discussed below in addition to above. The current control means 7 produces an alternating voltage reference value 74P which should be applied into the permanent magnet electric motor 3, on the basis of the magnetic pole phase operation signal 76P produced by the rotation speed 72P, the current detecting signal 32P, and magnetic pole phase operation means 11 mentioned below, other than torque reference value 71P, and outputs the alternating voltage reference value 74P into a pulse width modulation signal generating means 9.

The pulse width modulation signal generating means 9 converts the alternating voltage reference value 74P into a pulse width modulation signal 10P to drive the inverter bridge 2, and output the signal 10P into the inverter bridge 2.

Here, the magnetic pole phase operation signal 76P which is input into the current control means 7 must be accurate and must have a high resolution. Such a magnetic pole phase signal 76P is capable of being obtained by receiving both the rotation speed detecting signal 73P output from the permanent magnet electric motor 3 and the magnetic pole location signal 75P.

Figure 2:
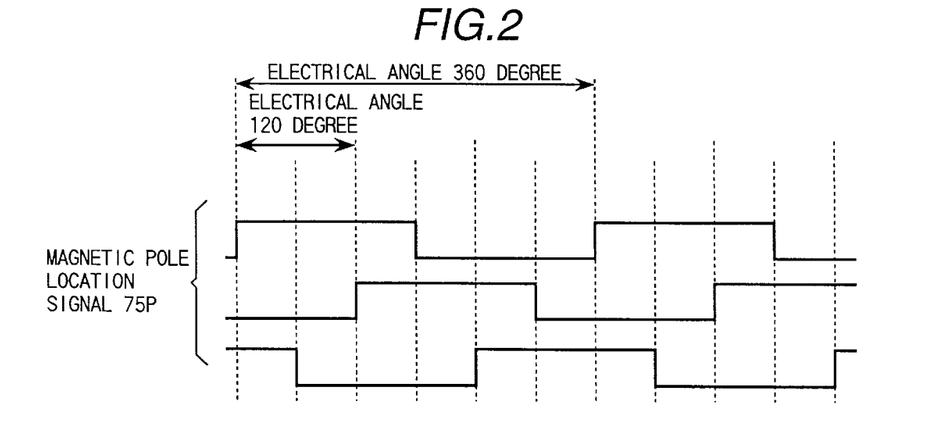
FIG. 2 is a signal chart of output signals from magnetic pole location detecting means 40 shown in FIG. 1.

FIG. 2 shows the magnetic pole location signal 75P which the magnetic pole location detecting means 40 outputs. The magnetic pole location signal 75P used in the three phase electric synchronous motor consists of three pulses having a 50% duty ratio as shown in the figure and a phase difference equivalent to an electrical angle of 120 degrees, and the three pulses rise up and fall down 6 times, in total, at every 60 degree of the electrical angle in a cycle of 360 degrees of the electrical angle.

Figure 3:
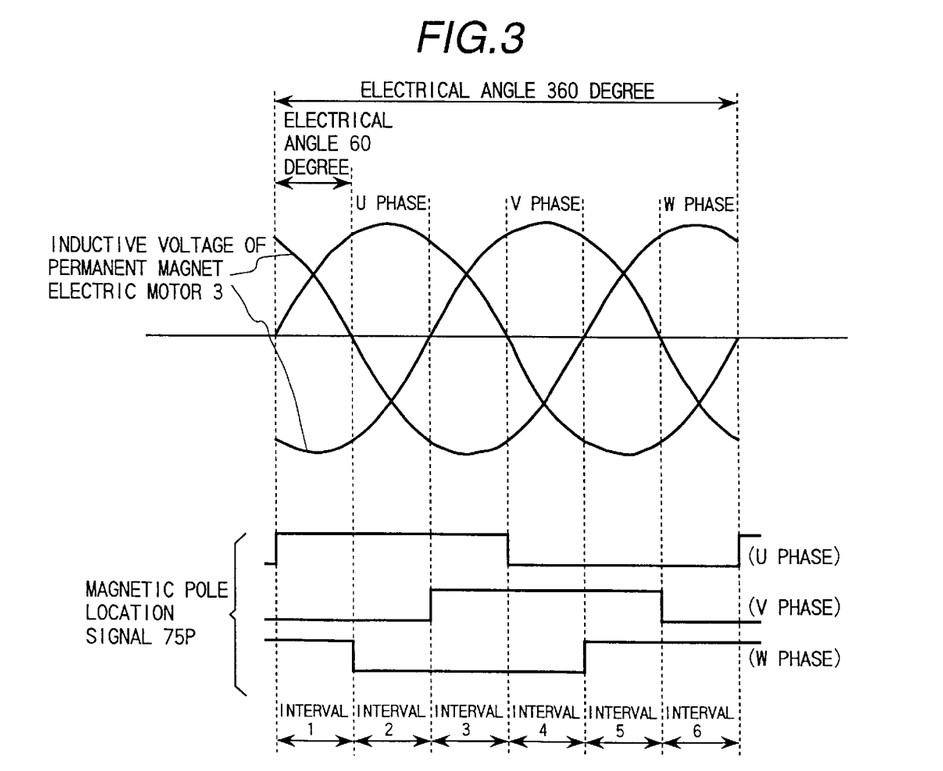
FIG. 3 is a signal chart showing an idea of adjustment of the magnetic pole location in FIG. 1.

FIG. 3 shows a phase relationship of the magnetic pole location signal 75P and an inductive voltage of the permanent magnet electric motor 3. The magnetic pole location signal 75P is synchronized to the inductive voltage of the permanent magnet electric motor 3 as shown in the figure, however resolution of the magnetic pole location detection by the magnetic pole location signal 75P is shown in FIG. 3 as one interval, that is, 60 degrees of the electrical angle, therefore, it is very coarse as to the magnetic pole phase signal to control the electric motor.

Therefore, by counting the pulses of the rotation speed detecting signal 73P output from the rotation speed detecting means 4 by the magnetic pole phase operation means 11, and by processing it by using the magnetic pole location signal 75P, the magnetic pole phase operation signal 76P is obtained corresponding to the magnetic pole phase.

In this embodiment of the present invention, the rotation speed detecting signal 73P consists of pulses named A phase and B phase having a 50% duty ratio and two pulses having a phase difference of ¼ wave length. Rotation speed detecting means 4 outputs 125 pulses per 360 degrees of the electrical angle relating to respective A, B phase of the rotation speed detecting signal 73P.

Figure 4:
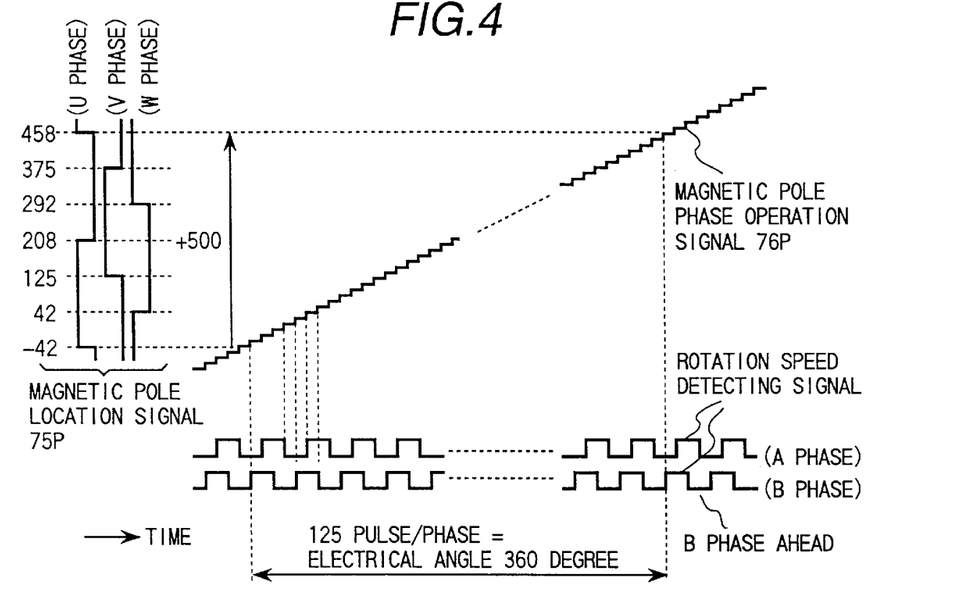
FIG. 4 is a graph showing a relationship between a pole phase operation signal 76P shown in FIG. 1 and a magnetic pole location (in forward rotation).
Figure 5:
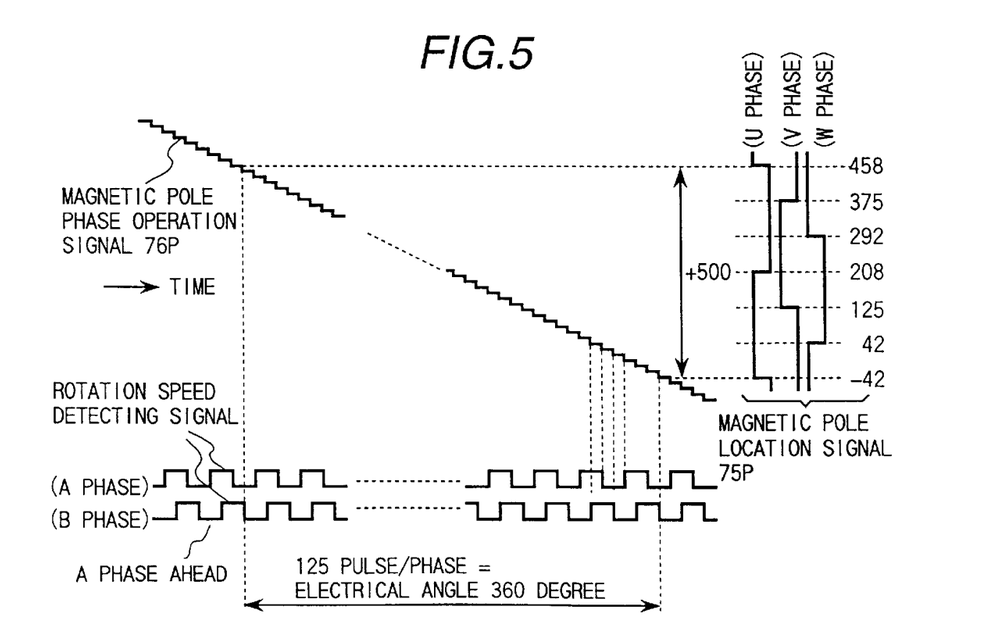
FIG. 5 is a graph showing a relationship between said magnetic pole phase operation signal 76P of FIG. 1 and said magnetic pole location (in reverse rotation).

An example of the above is shown by FIGS. 4 and 5. FIG. 4 is in the time when rotating normally and FIG. 5 is in the time when rotating in reverse. As shown in FIG. 4, when the permanent magnet electric motor 3 is rotating normally, the B phase goes ahead, and as shown in FIG. 5, when the permanent magnet electric motor 3 is rotated in reverse, the A phase goes ahead.

The magnetic pole phase operation means 11 increases the counting value when the B phase goes ahead, and decreases the counting value when the A phase goes ahead. The magnetic pole phase operation means 11 counts 500 times per 360 degrees of the electrical angle in rising up and in falling down of the A and B phases of the rotation speed detecting signal 73P.

Thereby, the magnetic pole phase operation signal 76P corresponds to the electrical degree in a one to one relation with a resolution of 360/500, which equals about 0.72 degrees in this embodiment.

Here, when 42 is subtracted as a value of the electrical angle 30 degree, it can be read as a phase voltage by adjusting a changing point of the magnetic pole location signal 75P so as to coincide with the line inductive voltage. For example, when the six changing points of the magnetic pole location signal 75P are adjusted to coincide with the line inductive voltage, they are expressed as 0, 60, 120, 180, 240, and 300 degrees in the electrical angles. As the phase voltage leads 30 degrees in the electrical angle from the line inductive voltage, they may be expressed as 458 (=−42), 42, 125, 208, 292, 375 in magnetic pole phase signal 76P. These are defined as magnetic pole phase theoretical values 84 in this embodiment.

Moreover, as the number 500 corresponds to 360 degrees of the electrical angle, in the magnetic pole phase operation signal 76P, the magnetic pole phase theoretical values 84 added or subtracted with any one of 500, 1000, 1500, . . . , 500×n means the same electrical angle each other. Here, n is a natural number.

Figure 6:
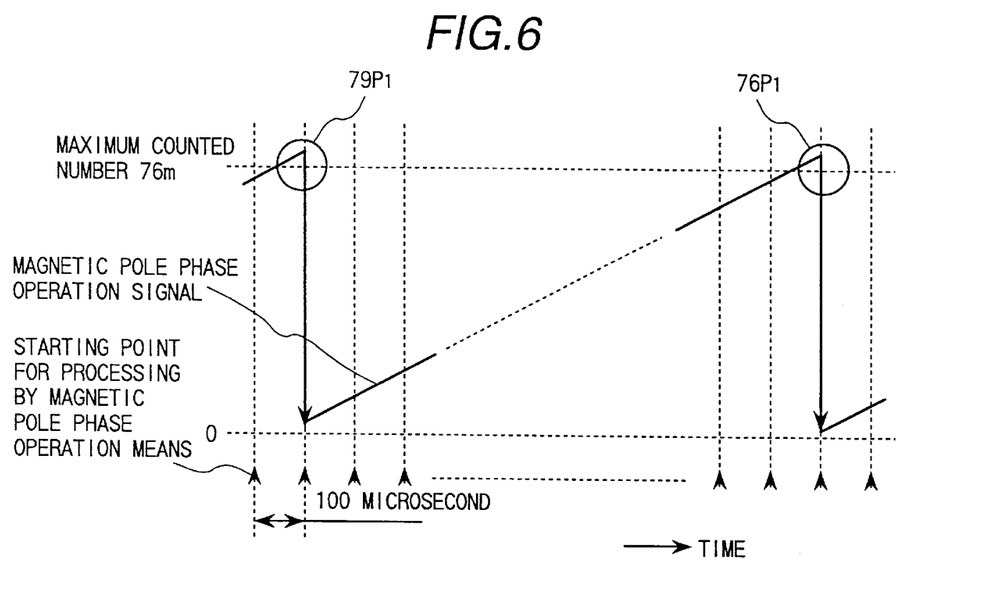
FIG. 6 shows count of said magnetic pole phase operation signal 76P shown in FIG. 1 (in forward rotation).
Figure 7:
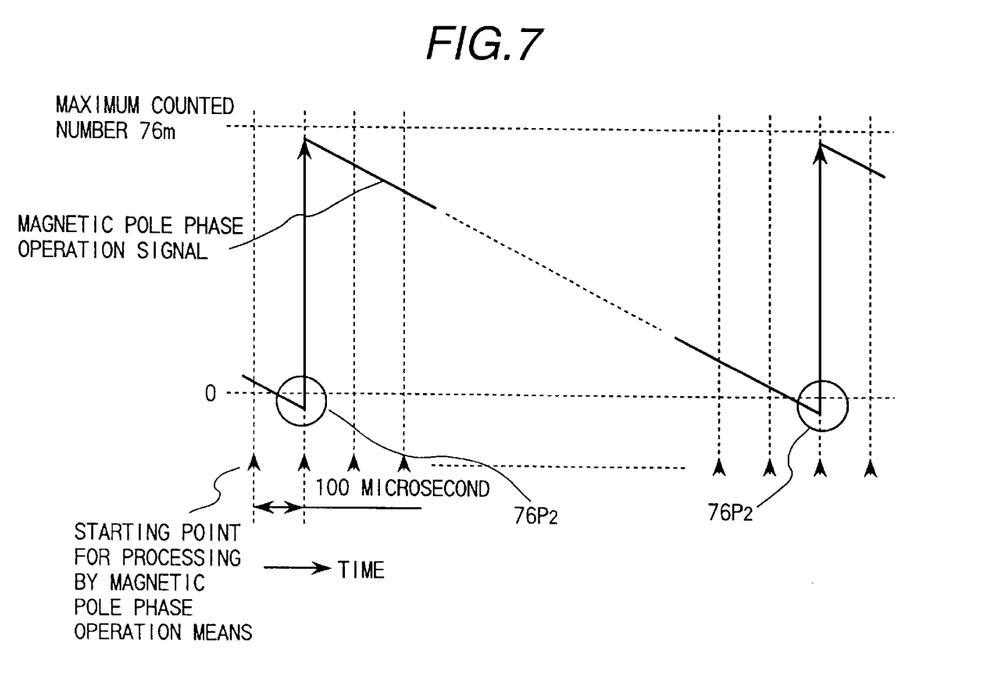
FIG. 7 shows count of said magnetic pole phase operation signal 76P shown in FIG. 1 (in reverse rotation).

The counted number of the magnetic pole phase operation signal 76P is shown by FIG. 6 and FIG. 7. FIG. 6 is in the forward rotation, and FIG. 7 is in the reverse rotation. The counted number range of the magnetic pole phase operation signal 76P by the magnetic pole phase operation means 11 are from zero to the maximum counted number 76 m being 500×n, however the magnetic pole phase operation means 11 searches the magnetic pole phase operation signal 76P every 100 micro seconds, and actually, overflow minute which is counted therebetween exists up and down of the range. In this embodiment of the present invention, the highest rotational speed of the permanent magnet electric motor 3 is 20,000 r.p.m., and the greatest overflow is 17 by 100 micro seconds.

The magnetic pole phase operation means 11 searches the magnetic pole phase operation signal 76P every 100 micro seconds. Thereby, the number 76P1 as a result of having reduced the greatest counted number 76 m from the magnetic pole phase operation signal 76P if the maximum counted number 76 m is exceeded in the forward rotation, and the number 76P2 as a result of having added the greatest counted number 76 m to the magnetic pole phase operation signal 76P if it is a value smaller than zero, namely a negative number, in the reverse rotation are respectively output as the magnetic pole phase operation signal. The rest obtained by dividing the magnetic pole phase operation signal 76P with the above-mentioned natural number n, with n always being an integer number from 0–499, and the current control means 7 may then utilize the rest as the magnetic pole phase signal.

Figure 8:
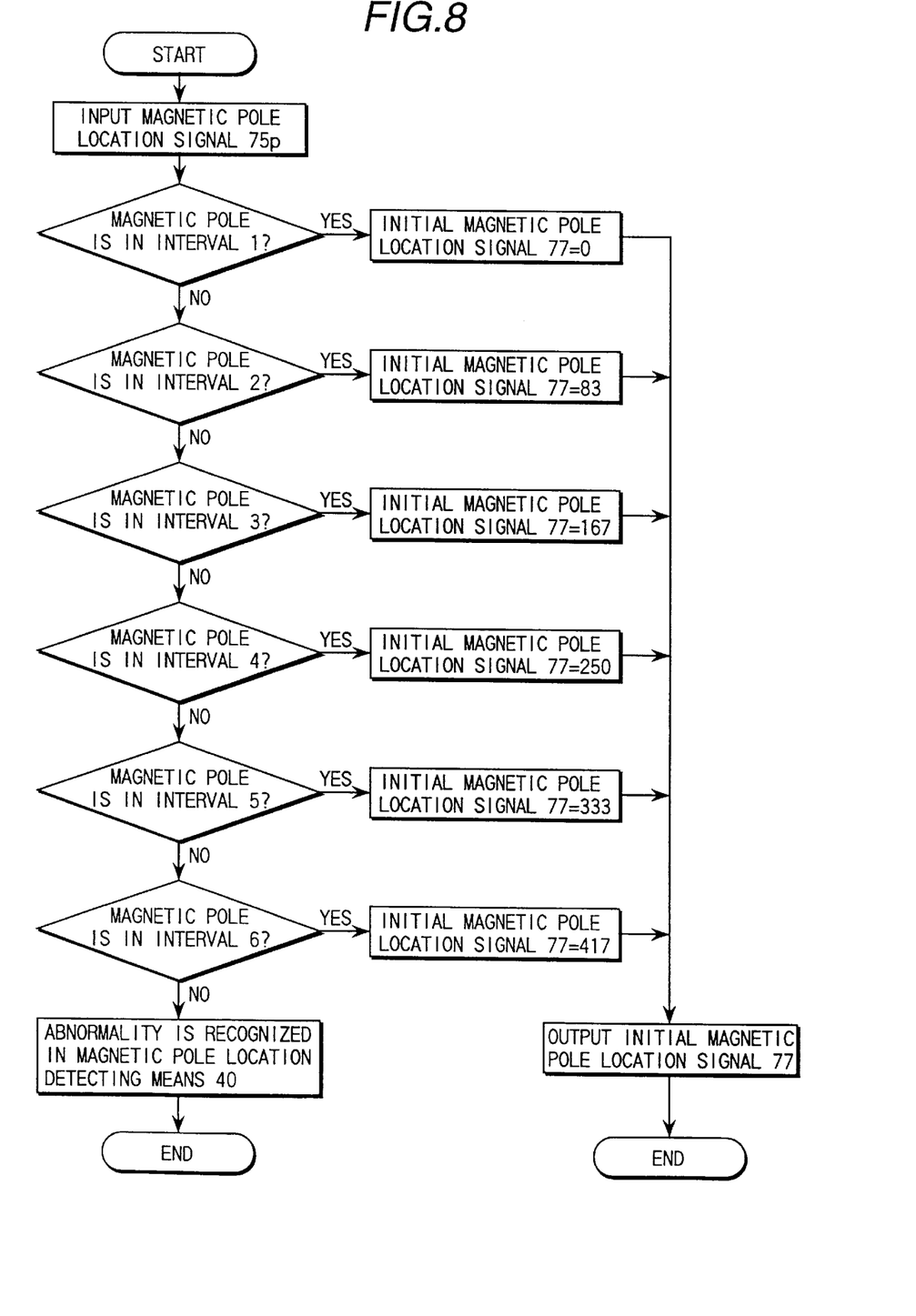
FIG. 8 is a flow chart showing a determination method of an initial magnetic pole location when starting a system of the present invention.
Figure 9:
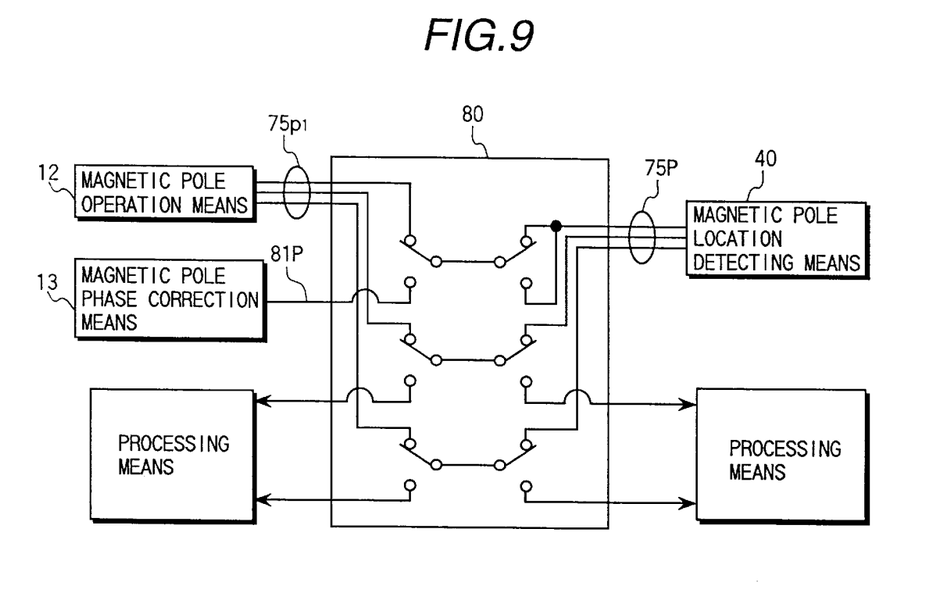
FIG. 9 is a block diagram illustrating the constitution of a port changing means shown in FIG. 1.
Figure 10:
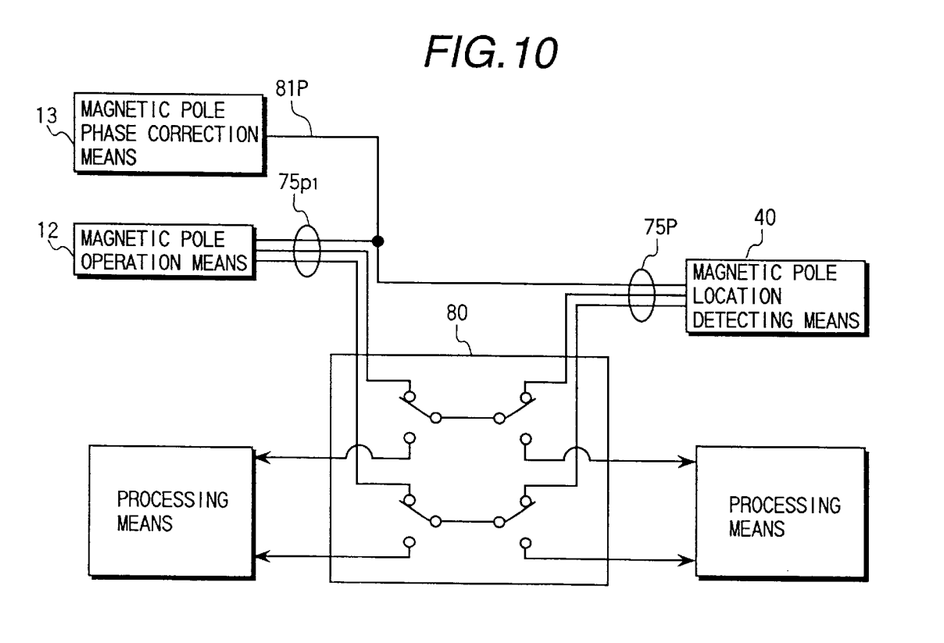
FIG. 10 is a block diagram illustrating another constitution example of the port changing means shown in FIG. 1.

Only in starting the system, the magnetic pole phase initial magnetic pole operation signal 76P utilizes the location signal 77P obtained by the magnetic pole location operation means 12. A flow chart for this function is shown by FIG. 8. That is to say, the magnetic pole operation means 12 receives the magnetic pole location signal 75P, judges whether the magnetic pole location is in a predetermined section, and outputs the initial magnetic pole location signal 77P into the magnetic pole phase operation means 11. The magnetic pole phase of the rotor in the system starting is unsettled, however, the port switching means 80 shown in FIGS. 9 and 10 outputs the magnetic pole location signal 75P as a magnetic pole location signal 75P1 into the magnetic pole location operation means 12. After the magnetic pole phase operation signal 76P is settled by the initial magnetic pole location 77P here, two of the magnetic pole location signals 75P which are not used as the magnetic pole phase reference signal 81P are unnecessary. Then the port switching means 80 lets these two loose, and is connected to a maximum two other signals which become necessary after the system starts and are not directly related to this embodiment. Thereby, the limited ports are effectively used.

The magnetic pole location operation means 12 judges the section of the magnetic pole location from a combination of the magnetic pole location signals 75P as shown in FIG. 3, and determines the initial magnetic pole location 77P which is a value in a center of the section. It is a value from 0 to 499 in this embodiment, and it becomes any one of 0, 83, 167, 250, 333, 417 because it is a led electrical angle 30 degrees in order to recognize the line inductive voltage as the phase inductive voltage. When the magnetic pole location signals 75P are all at a high level or all at a low level, there cannot be a combination in the above-mentioned six sections, therefore, it is decided that any anomaly is recognized in the magnetic pole location detecting means 40.

As the magnetic pole phase operation signal 76P upon system start-up, the initial magnetic pole location 77P as mentioned above is received. Because the initial magnetic pole location 77P is in the center of the section of the electrical angle 60 degrees, it includes a maximum error of ±30 degrees of the electrical angle from a location of the real magnetic pole. As it appears as an error of the location of the magnetic field that occurs in the coil of the stator by the alternating voltage reference value 74P, the torque which occurs in the permanent magnet electric motor 3 decreases at least as cos 30 =cos (−30) ≈0.866 times from the predetermined value.

The magnetic pole phase correction means 13 revises the operation magnetic pole phase 76 as explained above by utilizing the six variation points of the magnetic pole location signal 75P within the range of 360 degrees of the electrical angle and corresponding magnetic pole phase is known as the magnetic pole phase theoretical value 84 generally.

Figure 11:
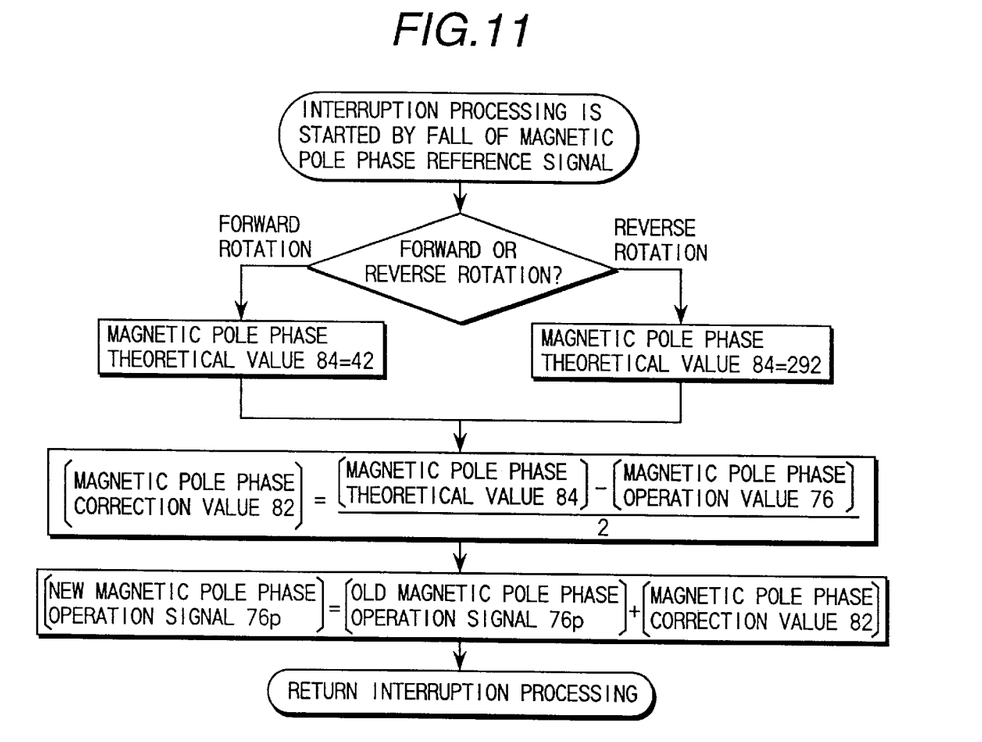
FIG. 11 shows a flow chart for correcting a magnetic pole phase signal shown in FIG. 1.

After the magnetic pole phase operation signal 76P is settled by the initial magnetic pole location signal 77P, the port switching means 80 outputs only an arbitrary one of the magnetic pole location signals 75P as the magnetic pole phase reference signal 81P into the magnetic pole phase correction means 13. In this embodiment, it is output into W phase. The magnetic pole phase correction means 13 revises an error of the magnetic pole phase operation signal 76P, at a rise and a fall of the magnetic pole phase reference signal 81P, by obtaining a difference of the magnetic pole phase operation signal 76 from the corresponding magnetic pole phase theoretical value 84, by operating a half of the difference as the magnetic pole phase correction value 82P, and by adding it to the magnetic pole phase operation signal 76P. A flow chart for this process is shown by FIG. 11.

Figure 12:
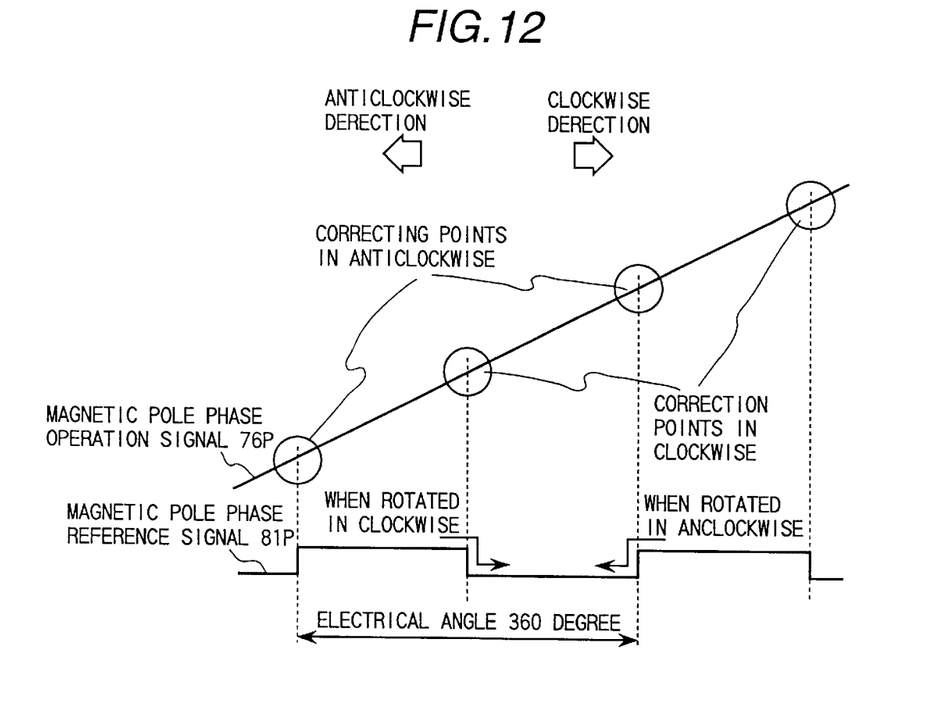
FIG. 12 shows a correction point of a magnetic pole phase operation signal shown in FIG. 1.

As shown in FIG. 12 of this embodiment, the magnetic pole phase correction means 13 works at the falling edge of the magnetic pole phase reference signal 81P, that is, at only one point of the six variation points of the magnetic pole location signal 75P which is included in 360 degrees of the electrical angle. This is because the running frequency of the magnetic pole phase correction means 13 in the microcomputer processing in a high-speed rotation of the permanent magnet electric motor 3 is decreased. On the other hand, as the inductive voltage of the permanent magnet electric motor 3 turns over according to the forward rotation or the reverse rotation, variation of the rise and fall of the magnetic pole phase reference signal 81P differs depending on the forward rotation or the reverse rotation. This means that the location of the magnetic pole that the magnetic pole phase correction means 13 works at is different depending on the forward rotation or the reverse rotation. Then in this embodiment, assuming that interruption processing is executed only in the fall under the constraint of the microcomputer, the magnetic pole phase theoretical value 84 is used so as to correspond to 42 in the forward rotation and to shown in correspond to 292 in the reverse rotation as FIG. 11.

Figure 13:
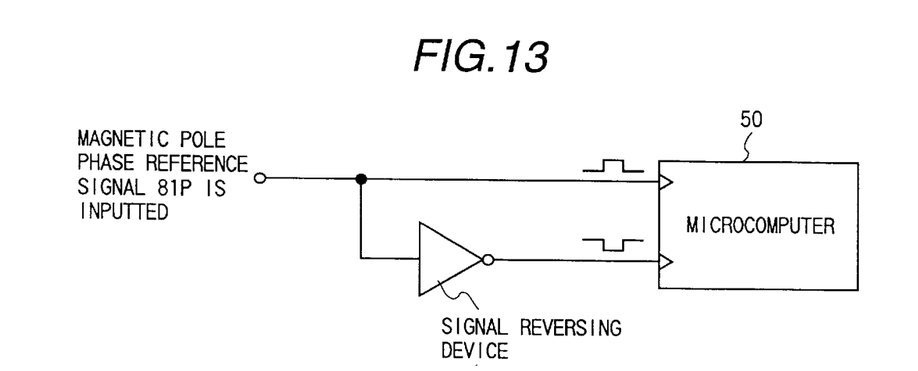
FIG. 13 shows an example in which the correction point of the magnetic pole phase operation signal shown in FIG. 1 becomes the same point in the forward rotation and the reverse rotation.

Here, if the microcomputer is adaptable to the rise and fall used, the same location of the magnetic pole may be used. If the microcomputer is not changeable to the rise and fall used as was assumed in the above embodiment, if the port which is different depending on the forward rotation or the reverse rotation may be used, the magnetic pole phase reference signal 81P is divided into two signals as shown in FIG. 13, and after turning over one of the two signals so as to be input, they may be respectively used in the forward rotation or the reverse rotation in spite of using the same magnetic pole.

Figure 14:
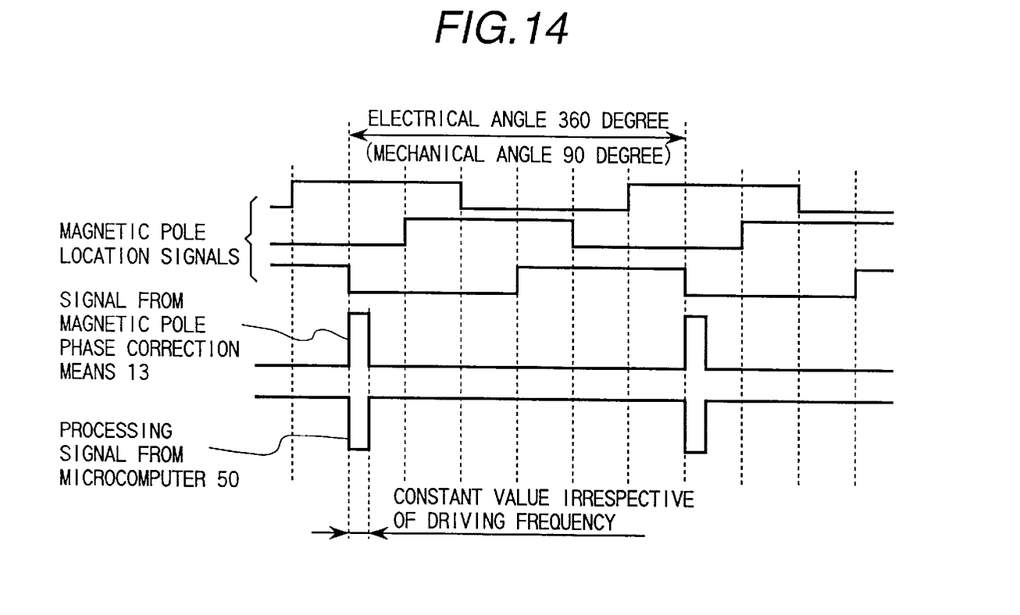
FIG. 14 is a signal chart showing a relationship between a magnetic pole phase signal correction processing of FIG. 1 and other processing (when processing frequency is few).
Figure 15:
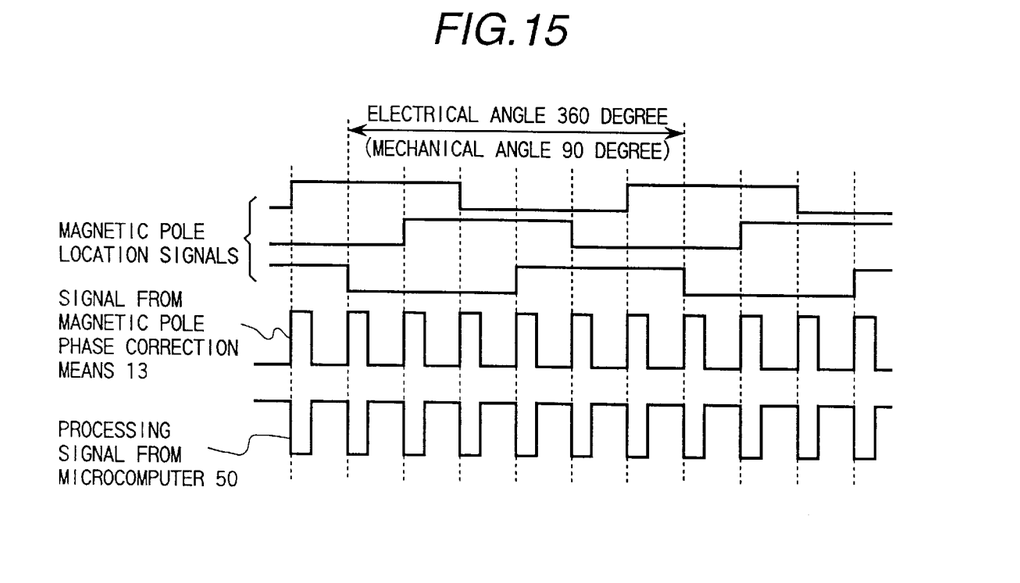
FIG. 15 is a signal chart showing a relationship between the magnetic pole phase signal correction processing of FIG. 1 and other processing (when processing frequency is many).

The reason why it is preferable to reduce the running frequency of the magnetic pole phase correction means 13 will next be explained. The relationship between the signal from the magnetic pole phase correction means 13, the processing signal from the microcomputer 50 except the magnetic pole phase correction means 13 and the magnetic pole location signals 75P is shown in FIGS. 14 and 15. Relating to the six variation points of the magnetic pole location signal 75P, the FIG. 14 shows a case using only one point, and the FIG. 15 shows a case using all of the six points. The magnetic pole phase correction means 13 interrupts the other processing, and it is executed with priority.

As the alternating voltage reference value 74P is output so as to be matched with the magnetic pole phase of the permanent magnet electric motor 3, so that high-speed spins permanent magnet electric motor 3, the control cycle is shortened to be handled frequently.

Incidentally, the driving frequency of the electric motor is expressed with the following equation:

Driving frequency={(pole number /2) /60}×(rotation speed)

Here (pole number /2) equals the pole logarithm, and the unit of a rotation speed is expressed as [RPM] and the unit of frequency is expressed as [Hz].

Accordingly, for example, the drive frequency of the electric motor having 8 poles rotated by 13000 RPM becomes 867 Hz, and this cycle time is about 1.153 milliseconds. Therefore, the control cycle should seconds even the best.

On the other hand, 360 degrees of the electrical angle of the electric motor having 8 poles corresponds to 90 degrees of the mechanical angle. When all of the six variation points are used relating to 360 degrees of the electrical angle of the magnetic pole location signal 75P, the cycle of variation of the magnetic pole location signal 75P may be expressed with the following equation:

Cycle of the variation={60×(2/pole number)}/6/ rotation speed

Here, (2/pole number) equals the reciprocal number of the pole logarithm, the unit of rotation speed is [RPM], and the unit of the cycle time of the variation is [second].

Accordingly, when an 8-pole electric motor rotates at 13000 RPM, as the cycle of the variation of the output pulse of the magnetic pole location signal 75P is about 192.3 micro seconds, interruption processing by the magnetic pole phase correction means 13 which needs about 6 micro seconds in once regardless of the rotation speed is executed about every 192.3 micro seconds. That is, according to a rise of the rotation speed of the electric motor, the processing burden of the magnetic pole phase correction means 13 in the microcomputer increases, thereby other control processing becomes difficult. Reduction of the processing number of the magnetic pole phase correction means 13 and simplification of the processing itself becomes necessary.

In the magnetic pole phase correction means 13 of this embodiment, because error of the operation magnetic pole phase 76P is decreased to be a half in one processing, 30 degrees of the electrical angle as the greatest error in system starting is about 0.469 degrees or less of the electrical angle which is less than the resolution in the processing taken place six times. That is, when the six variation points per 360 degrees of the electrical angle of the magnetic pole location signal 75P are changed to be one point, thereby execution frequency of the magnetic pole phase correction means 13 is decreased to be ⅙, the error is converged at a rotation of 2160 degrees of the electrical angle even maximum. If using the electric motor having 8 poles, 2160 degrees of the electrical angle corresponds to 540 degrees of the mechanical angle, this corresponds to 1.5 rotation of the electric motor.

When using all of the six variation points of the magnetic pole location signal 75P, the magnetic pole phase correction means 13 actuates the first operation after performing a rotation equivalent to the electrical angle 60 degrees even maximum. On the contrary, when using one variation point, the magnetic pole phase correction means 13 actuates the first operation after performing a rotation equivalent to the electrical angle 330 degrees at the maximum. A torque is stopped so as to be decreased during this time, however, it is secured 0.866 times at last as mentioned above, and it gets closer to 1.000 times at every execution of the magnetic pole phase correction means 13 afterward.

In this embodiment, the magnetic pole phase correction value 82P is determined to be a half of the difference of the operation magnetic pole phase 76 from the magnetic pole phase theoretical value 84, and this is because the variation of the operation magnetic pole phase value 76 includes the integral element. Moreover according to this method, an error based on false counting of the magnetic pole phase operation means 11 caused by the noise overlapping the rotation speed detecting signal 73P is able to be revised.

Figure 16:
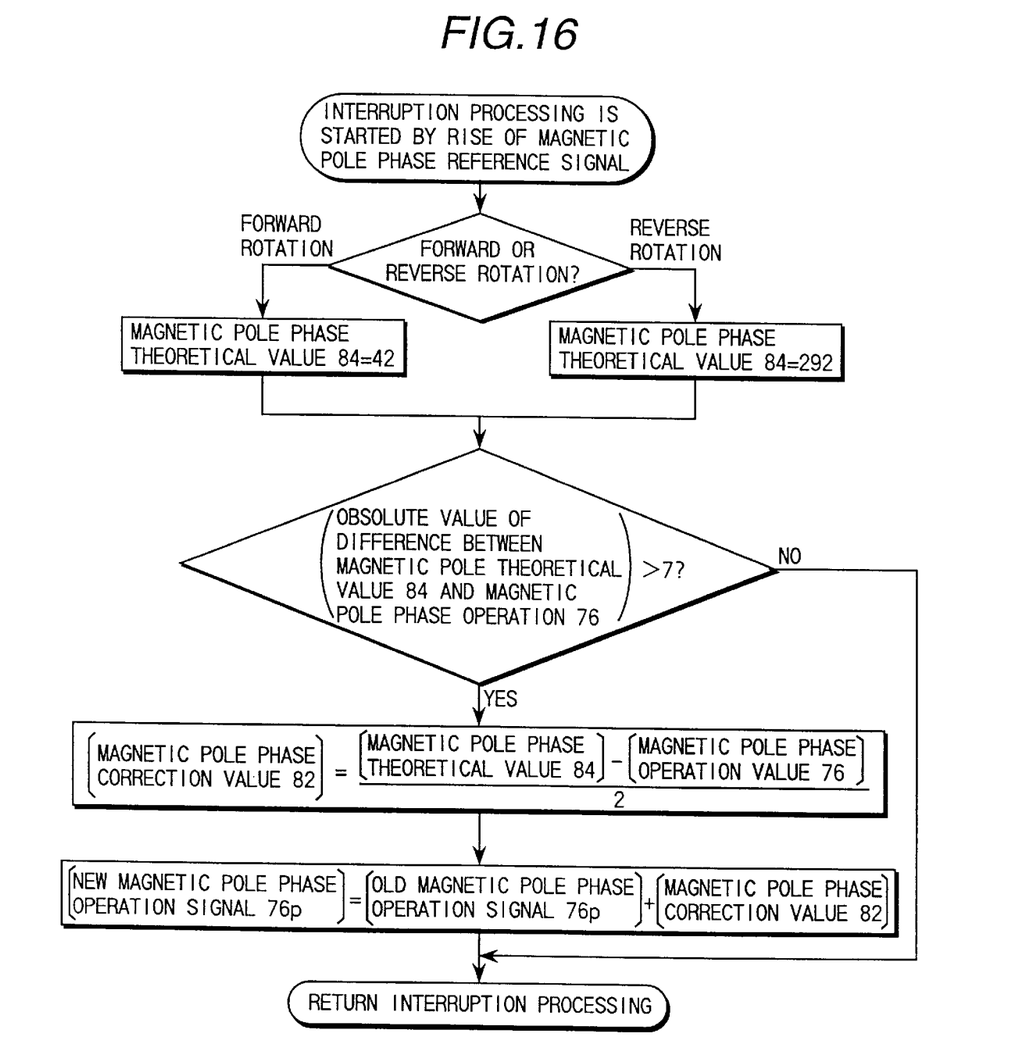
FIG. 16 shows a simplified example of a flow chart of a magnetic pole phase signal correction processing shown in FIG. 1.

Actually, when the difference between actual occurring torque and a predetermined value thereof can be ignored, processing of the magnetic pole phase correction means 13 may be simplified as shown in the example of FIG. 16. For example, if the error of the magnetic pole phase converges in five degrees or less of the electrical angle, the generating torque is secured to be cos 5=cos (−5)≈0.996 degrees or more. In this embodiment, when this condition is filled and the difference of the generating torque from the predetermined value thereof can be ignored, and the magnetic pole phase correction means 13 searches the difference between the magnetic pole phase theoretical value 84 corresponding to the magnetic pole phase reference signal 81P and the operation magnetic pole phase 76P, and when the magnitude of the searched result is seven or less, a later execution of the processing is omitted. That is, the magnetic pole phase correction value 82P is operated, and processing to add to the magnetic pole phase operation signal 76P becomes unnecessary.

What is claimed is:

1. A control apparatus of an electric motor vehicle comprising: means for operating an initial magnetic pole location based on three phase magnetic pole location signal pulses of a permanent magnet electric motor in starting an electric motor vehicle, means for operating a magnetic pole phase of said permanent magnet electric motor on the basis of said initial magnetic pole location, a rotation pulse of the permanent magnet electric motor, and a correction value, are operated with a rise and fall of said three phase magnetic pole location signal pulse after starting, means for determining a current to be supplied into said permanent magnet electric motor based on said magnetic pole phase and a torque reference value, means for correcting said magnetic pole phase when a predetermined one of said three phase magnetic pole location signal pulses rises or falls, and a port changing means in which all magnetic pole location signal pulses of three phase detected from said permanent magnet electric motor are supplied to said current control means upon starting said electric motor vehicle and only a predetermined one of said magnetic pole location signal pulses is supplied to said current control means after the starting.

2. A control apparatus of an electric motor vehicle comprising: means for operating an initial magnetic pole location based on three phase magnetic pole location signal pulses of a permanent magnet electric motor in starting an electric motor vehicle, means for operating a magnetic pole phase of said permanent magnet electric motor on the basis of said initial magnetic pole location, a rotation pulse of the permanent magnet electric motor, and a correction value, are operated with a rise and fall of said three phase magnetic pole location signal pulse after starting, means for determining a current to be supplied into said permanent magnet electric motor based on said magnetic pole phase and a torque reference value, means for correcting said magnetic pole phase when a predetermined one of said three chase magnetic pole location signal pulses rises or falls, a magnetic pole location detecting means for outputting magnetic pole location signal pulses of three phase according to magnetic pole locations of said permanent magnet electric motor, a magnetic pole location operation means for operating an initial magnetic pole location based on said magnetic pole location signal pulses of said three phases, a magnetic pole phase correction means for supplying said magnetic pole location correction value to said magnetic pole phase operation means based on a predetermined one of said magnetic pole location signal pulses of said three phases, and a port changing means in which all of said magnetic pole location signal pulses are supplied to said magnetic pole location operation means upon starting said electric motor vehicle, and a predetermined one of said magnetic pole location signal pulses is supplied to said magnetic pole phase correction means and the other two of said magnetic pole location signal pulses stop being supplied to said magnetic pole location operation means after the starting.

3. A control apparatus of an electric motor vehicle as defined in claim 2, wherein said port changing means changes said magnetic pole location signal of said two phases separated from said magnetic pole location operation means into a signal to or from a processing means which does not relate to said magnetic pole location operation means.

* * * * *